United States Patent Office 3,420,176
Patented Jan. 7, 1969

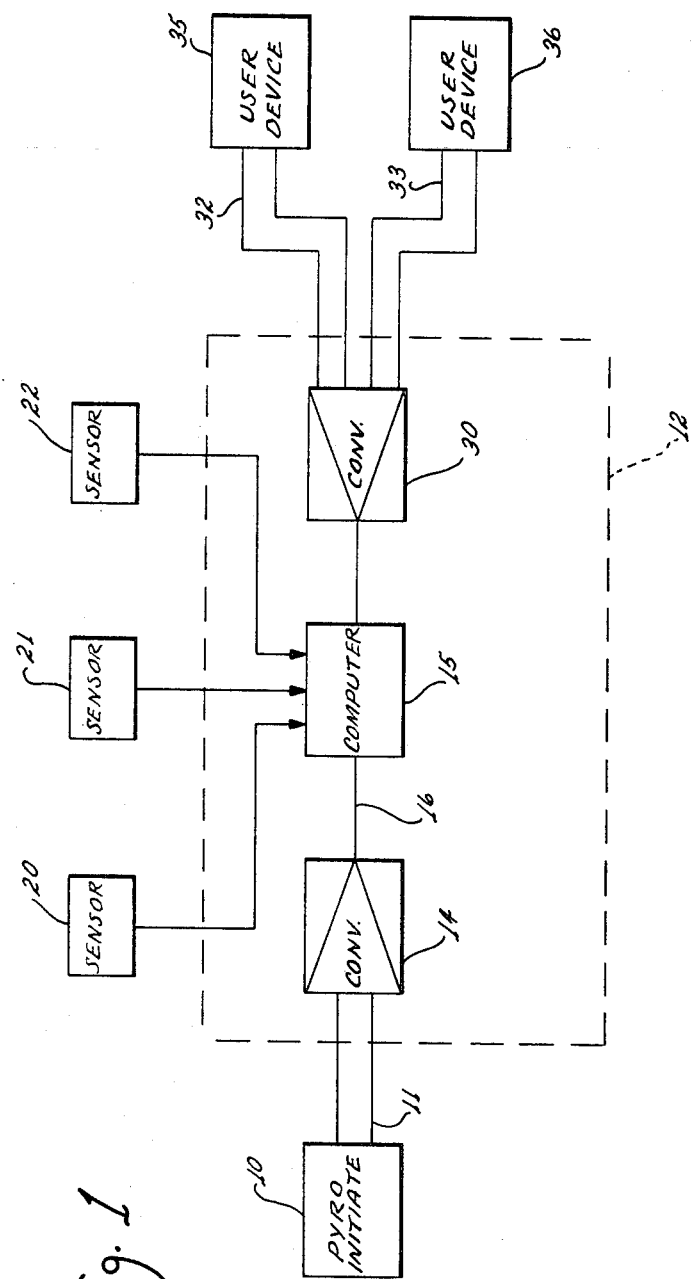

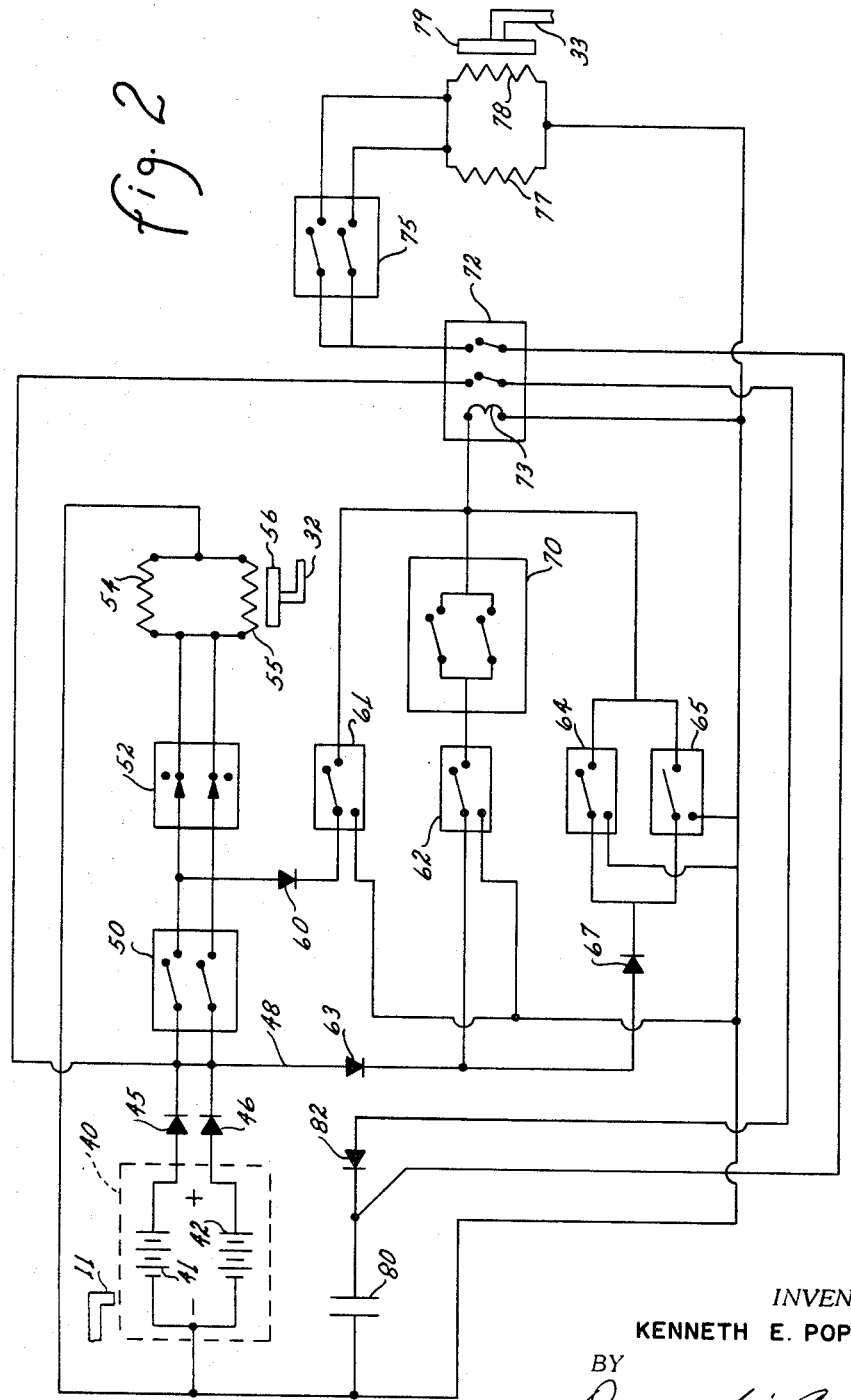

3,420,176
ELECTRICAL PYROTECHNIC PROGRAMMING SYSTEM
Kenneth E. Pope, Litchfield Park, Ariz., assignor to UMC Industries, Inc., a corporation of Missouri
Filed Apr. 10, 1967, Ser. No. 629,556
U.S. Cl. 102—70.2       8 Claims
Int. Cl. F42c 13/00

ABSTRACT OF THE DISCLOSURE

An electrical pyrotechnic programming system, including a pyrotechnic signal source for activating an electrical power source. The power source provides current to an electrical switching system, including individual switches responsive to velocity acceleration and barometric altitude. Closure of the switches after actuation of the electrical power source produces a pyrotechnic output signal by igniting bridge wires.

Background of the invention

The present invention pertains to programming systems, and more particularly, to programming systems of the type utilized in pyrotechnic applications. In systems utilizing pyrotechnic devices such as ejection seat mechanisms for high-speed aircraft, it is important to trigger the pyrotechnic devices at predetermined intervals in accordance with environmental factors. The actuation of an ejector rocket to propel a pilot from an aircraft is customarily followed by subsequent pyrotechnic events predicated on such environmental factors as velocity, acceleration, and altitude.

Prior art pyrotechnic programming devices have utilized pyrotechnic time delays incorporating mechanical pyrotechnic train interrupters to program the sequence of events occurring after ejection. Typically, the pyrotechnic time delay would comprise a timing fuse interrupted by mechanical devices responsive to altitude, acceleration, and velocity. The utilization of pyrotechnic or mechanical delays is considerably less accurate and reliable than equivalent time delays utilizing electrical energy. Further, pyrotechnic time delays and time delay trains cannot be tested since such testing would automatically incorporate the destruction of the device.

Truly electrical programming systems require storage of electrical energy that may subsequently be utilized upon demand; further, power requirements of a pure electrical system as well as the susceptibility of such systems to RF fields render such programming systems generally unacceptable.

It is therefore an object of the present invention to provide a programming system for use in a pyrotechnic application.

It is a further object of the present invention to provide a programming system utilizing both pyrotechnic and electrical devices.

It is still another object of the present invention to provide an electrical pyrotechnic programming system wherein electrical computation of environmental factors is superimposed on an otherwise all-pyrotechnic system.

These and other objects of the present invention will become apparent to those skilled in the art as the description thereof proceeds.

Brief description of preferred embodiment

Briefly, the present invention contemplates the utilization of an electrical power source responsive to a pyrotechnic input for providing power to an electrical computation system. The computation system will implement predetermined time delays as well as provide means for effecting necessary controls imposed by environmental sensors. The output of the electrical computation system is re-converted into a pyrotechnic output for use in a pyrotechnic system.

Brief description of drawings

The present invention may more readily be described by reference to the accompanying drawings in which:

FIGURE 1 is a block diagram of an electrical pyrotechnic programming system constructed in accordance with the teachings of the present invention.

FIGURE 2 is a circuit diagram and partial block diagram of a programming system constructed in accordance with the teachings of the present invention.

Detailed description of the drawings

Referring to FIGURE 1, a pyrotechnic initiation device 10 is shown for providing a pyrotechnic input signal to the programming system. The initiation device may typically be a percussion-type cap that may be electrically or mechanically actuated or triggered. The pyrotechnic signal thus generated is transmitted through a shielded mild detonating cord 11 to the programming system 12. The programming system 12 includes a pyro-electrical conversion system 14 for converting the pyrotechnic signal delivered to the programming system by the detonating cord into electrical power for utilization within the programming system. The pyro-electrical conversion system 14 provides electrical power to the electrical computation system 15 through electrical conductor 16. The electrical computation system 15 also receives a plurality of inputs from environmental sensors 20, 21, and 22. In the particular embodiment chosen for illustration, the environmental sensors 20, 21, and 22 are utilized to sense velocity, acceleration, and barometric altitude, respectively.

The output of the electrical computation system 15 is applied to an electro-pyrotechnic conversion system 30 which reconverts the electrical energy into pyrotechnic energy for subsequent utilization in the pyrotechnic system. The output of the electro-pyrotechnic conversion system 30 also represents the output of the programming system 12. This output is in the form of an output pyrotechnic signal delivered over detonating cords 32 and 33 to pyrotechnic utilization devices 35 and 36, respectively.

Referring now to FIGURE 2, the relationship to FIGURE 1 is illustrated by the indication of the detonating cords 11, 32, and 33. Thus, it may be seen that FIGURE 2 represents the programming system 12 of FIGURE 1. A dual electrical power source 40 is shown and comprises parallel connected batteries 41 and 42. The batteries 41 and 42 are each responsive to a pyrotechnic input from the detonating cord 11 for assuming an active state. The specific batteries used may conveniently be of the type known in the art as "thermal batteries." Typically, such batteries are in an inactive state with the electrolyte in a crystalline form. The batteries have percussion caps in the top thereof which are actuated by a pyrotechnic input for heating the crystalline material therein to form a liquid electrolyte and thus produce an electrical power source in an active state. Alternatively, the batteries may be of the "dry-charge" type having a plastic separator between the battery plates and a liquid electrolyte. Such batteries are presently available in the art and can be obtained with activator devices that are responsive to a pyrotechnic input for puncturing the plastic separator to thereby permit the liquid electrolyte to enter the volume around the plates to thus provide an electrical power source in an active state. Such power sources as the thermal battery and dry-charge battery have substantially infinite shelf life and may conveniently be contained within the programming system of the present invention without the need of maintenance or periodic replacement. Until the electrical power source is switched from an inactive to an active state, there is no stored electrical energy present in the programming system and, therefore, no danger of short-circuiting or inadvertent release of energy prior to the programming system use.

The output of the electrical power source 40 is connected through a pair of diodes 45 and 46 to a common bus 48. A velocity-sensitive switch 50, commonly known in the art as a Q switch, is connected to the bus 48 and includes a pair of contacts that may be adjusted to close below a predetermined velocity and open above that predetermined velocity. The Q switch 50 is connected to an unlatch delay switch 52 which includes a pair of normally closed contacts that "unlatch" or open after a predetermined time delay triggered by the flow of current through the contacts. Such unlatching switches are well known in the art and are readily available having a variety of delay times for opening after the application of electrical current therethrough. The unlatch switch 52 is connected to a pair of bridge wires 54 and 55 that are responsive to electrical current flowing therethrough for generating a pyrotechnic output signal. The bridge wires are one type of pyrotechnic initiator that may be used to generate sufficient heat to activate the detonating cord 32. In some instances, it may be necessary to have a heat booster 56 to assist in the proper activation of the detonating cord in response to the actuation of the bridge wire.

The output of the Q switch 50 is also connected through a diode 60 to a time delay switch 61 which, in the embodiment chosen for illustration, represents a time delay of one second. A second time delay switch 62 is connected to the common bus 48 through a diode 63 and represents a time delay of 1.6 seconds. Dual time delay switches 64 and 65 are connected in parallel and are each connected to the common bus 48 through a diode 67. The time delay switches 64 and 65, in the embodiment chosen for illustration, represent time delays of 4.4 seconds. The output of the switch 62 is applied through an acceleration sensor switch 70 to a latching switch 72. Similarly, the switches 61, 64, and 65 are connected to the same latching switch 72. These switches are connected specifically to the actuating coil 73 of the latching switch 72 which, when actuated, will open the normally closed contacts and close the normally open contacts of the latching switch 72. The normally open contacts of the latching switch 72 are connected in series with a barometric altitude sensor switch 75 which, in turn, is connected to pyrotechnic initiators or bridge wires 77 and 78. The activation of the bridge wires 77 or 78 results in the initiation of a pyrotechnic signal with the help of the heat booster 79; the pyrotechnic signal is delivered to a pyrotechnic utilization device through the detonating cord 33.

The normally closed contacts of the latching switch 72 connect the positive side of the electrical power source 40 to a storage capacitor 80 through a diode 82. The storage capacity may typically be a low-leakage device such as a solid tantalum capacitor.

The purpose of the various elements of FIGURE 2 as well as the operation of a preferred embodiment will now be described. It will be assumed that the programming system of the present invention is to be utilized to program events occurring after a pilot has been ejected from an aircraft. A pyrotechnic initiation device has therefore been triggered, either manually by the pilot or automatically by other means. The initiation device has resulted in the ejection of the pilot and the pyrotechnic signal input to the programming system. The pyrotechnic input is applied to the inactive electrical power source such as the batteries described previously. The electrical power source is thus converted to its active state and electrical power is provided to the electrical computation system of the programming system.

Referring now to FIGURE 2, it may be seen that electrical power is applied to the Q switch 50. The switch may typically be calibrated to close when the velocity of the pilot is below 350 knots. The closure of the Q switch 50 applies power directly to the bridge wires 54 and 55, resulting in the generation of a pyrotechnic signal on the detonating cord 32. The pyrotechnic signal delivered on the cord 32 may be used for such pyrotechnic tasks as ignition of orientation rockets. The unlatch switch 52 will insure that only sufficient power is applied to the bridge wires 54 and 55 to activate the latter; in the event that the bridge wires should become shorted when they fire, the subsequent unlatching of the switch 52 will present undue current drain on the electrical power source. Actuation of the Q switch 50 to the closed position also applies power through the diode 60 to the one second delay switch 61. After the delay, the switch closes energizing the relay coil 73, thus resulting in the opening of the normally closed contacts and closing of the normally open contacts of the latching switch 72. Opening of the normally closed contacts breaks the charging circuit wherein the capacitor 80 became charged from the electrical power source 40 after the latter assumed the active state. Closing of the normally open contacts of the latching switch 72 applies the stored charge on the storage capacitor 80 to the barometric altitude sensor switch 75. Typically, the switch 75 may be calibrated to close the contacts at an altitude below 15,000 feet. Thus, when the pilot reaches an altitude below 15,000 feet and the Q switch has been closed by reason of the pilot's velocity, the capacitor 80 will be discharged through the switch 75 and the bridge wires 77 and 78. The current flowing through the bridge wires 77 and 78 results in a pyrotechnic signal on the detonating cord 33. Typically, this pyrotechnic signal may be utilized to open the chute canister to result in the subsequent deployment of the parachute.

When the electrical power source 40 becomes active, electrical power is also applied to the bus 48 and thus to the delay switch 62. A one second delay after the application of electrical power to the switch 62 results in the application of power to the acceleration sensor switch 70. Typically, the switch 70 may be set to close contacts when the pilot's acceleration drops below 2.2 g. The closing of the contacts of the switch 70 will apply electrical power to the relay coils 73, resulting in actuation of the bridge wires 77 and 78 as described previously. Without regard to the velocity (the state of the Q switch 50) or the pilot's acceleration (the state of the switch 70), the time delay switches 64 and 65 will energize the relay coil 73 after the time delay of 4.4 seconds. Therefore, as an emergency measure, the pilot's velocity and acceleration will be disregarded to effect a parachute deployment when the pilot's altitude drops below 15,000 feet.

It may therefore be seen that the capacitor 80 provides a means for storing electrical energy to subsequently be utilized to produce a pyrotechnic output signal, thus relieving the electrical power source 40 from having to generate the signal after an extended period of time. The battery may thus be energized and the electrical computation system of the programming system activated to the degree necessary to provide the time delays and switch actuations; however, without regard to the power requirements of the computation system, sufficient electrical energy will initially be stored in the capacitor 80 to insure actuation of the pyrotechnic initiator or bridge wires 77 and 78. It will also be apparent that the embodiment chosen for illustration includes substantial redundancy typically found in applications requiring high reliability. The system of the present invention is initiated by a pyrotechnic signal and contains no stored electrical energy prior to the triggering of the system by the pyrotechnic signal. Although the present programming system is pyrotechnically actuated, the system utilizes electrical time delay relays and other sensing devices that are considerably more reliable and accurate than pyrotechnic or mechanical devices of similar types. The electrical computation system of the programming system of the present invention may be tested for accuracy of time delay, responsiveness to environmental changes, etc., without affecting the subsequent use of the system. The device of the present invention is completely passive to RF fields and energy since no electrical connections enter or leave the programming system, thereby permitting the system to be mounted in a completely enclosed and shielded housing.

It may therefore be apparent to those skilled in the art that many modifications may be made in the system of the present invention without departing from the spirit and scope thereof. It is therefore intended that the present invention be limited only by the scope of the claims appended hereto.

I claim:

1. A programming system comprising: a pyrotechnic signal source; an electrical power source having an inactive and an active state, said power source being connected to said signal source and responsive to a pyrotechnic signal for assuming said active state; environmental sensing means responsive to predetermined environmental conditions for actuating electrical switches, means electrically connecting said switches to said power source; a pyrotechnic initiator connected to said switches in a manner to be responsive to the actuation of one of said switches and the active state of said power source for producing a pyrotechnic output signal.

2. The combination set forth in claim 1 wherein said pyrotechnic signal source includes a detonating cord.

3. The combination set forth in claim 1 wherein said environmental sensing means includes velocity, acceleration, and altitude sensors.

4. The combination set forth in claim 1 wherein said pyrotechnic initiator comprises a bridge wire responsive to an electrical current therethrough for activating a shielded mild detonating cord.

5. A programming system comprising: an electrical power source having an inactive and an active state, said source being responsive to a pyrotechnic input for achieving said active state; a plurality of time delay switches; a plurality of environmental sensing electrical switches; means electrically connected to said power source and responsive to said active state for generating predetermined time delays and for actuating said time delay electrical switches at the end of said time delays; environmental sensing means responsive to predetermined environmental conditions for actuating said environmental sensing electrical switches connected in electrical series with said time delay electrical switches; a pyrotechnic initiator responsive to the active state of said power source, the actuation of one of said time delay electrical switches and a series-connected environmental sensing electrical switch for producing a pyrotechnic output.

6. The combination set forth in claim 5 wherein said enviromental sensing means includes velocity, acceleration, and altitude sensors.

7. The combination set forth in claim 5 wherein said pyrotechnic initiator comprises a bridge wire responsive to an electrical current therethrough for activating a shielded mild detonating cord.

8. The combination set forth in claim 7 wherein said power source is responsive to a pyrotechnic input comprising an activated shielded mild detonating cord.

References Cited

UNITED STATES PATENTS 3,011,036  11/1961  Wallack et al. _____ 102—70.2

SAMUEL FEINBERG, *Primary Examiner.*

VERLIN E. PENDEGRASS, *Assistant Examiner.*